United States Patent
Davis et al.

(10) Patent No.: US 6,385,168 B1
(45) Date of Patent: May 7, 2002

(54) FAIR SHARE BANDWIDTH ALLOCATION ALGORITHM AND DEVICE

(75) Inventors: Tom Davis, Ottawa; Sudhakar Ganti, Nepean; Denny L. S. Lee, Kanata, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 08/878,964

(22) Filed: Jun. 19, 1997

(51) Int. Cl.[7] ............................................. H04L 12/26
(52) U.S. Cl. ................................. 370/230; 370/236.1
(58) Field of Search ........................... 370/231, 232, 370/229, 230, 468, 252, 253, 233, 234, 395, 230.1, 236.1

(56) References Cited

U.S. PATENT DOCUMENTS

| | | | | |
|---|---|---|---|---|
| 5,313,454 A | * | 5/1994 | Bustini et al. ................. 370/13 |
| 5,594,729 A | * | 1/1997 | Kanakia et al. .............. 370/468 |
| 5,734,825 A | * | 3/1998 | Lauck et al. ............ 395/200.13 |
| 5,737,313 A | * | 4/1998 | Kolarov et al. .............. 370/468 |
| 5,805,577 A | * | 9/1998 | Jain et al. ..................... 370/234 |
| 5,864,536 A | * | 1/1999 | Foglar ......................... 370/232 |
| 5,867,482 A | * | 2/1999 | Kobayashi ................... 370/252 |
| 5,898,669 A | * | 4/1999 | Shimony et al. ............. 370/232 |
| 5,926,625 A | * | 7/1999 | Corlett et al. ........... 395/200.51 |
| 5,956,322 A | * | 9/1999 | Charny ........................ 370/468 |
| 5,966,381 A | * | 10/1999 | Buckley et al. .............. 370/468 |
| 6,046,983 A | * | 4/2000 | Hasegawa et al. ........... 370/468 |

OTHER PUBLICATIONS

Jangkyung Kim et al; "Fixed Queue Length (FQL) Control for ABR with Long Propagation"; ATM Forum/97–0008, Feb. 1997.
L. Kalampoukas et al; "An efficient rate allocation algorithm for ATM networks providing max–min fairness".
Cathy Fulton et al; "UT: ABR Feedback Control with Tracking"; ATM Forum/96–1540, Nov. 10, 1996.
S. Mascolo et al; "ATM Rate Based Congestion Using a Smith Predictor: an EPRCA Implementation". Proceedings on INFOCOM '96, vol. 2, pp 569–576.
The ATM Forum Technical Committee; Traffic Management Specification Version 4.0; Apr. 1996.

* cited by examiner

Primary Examiner—Chau Nguyen
Assistant Examiner—D. Trinh
(74) Attorney, Agent, or Firm—Marks & Clerk

(57) ABSTRACT

A device and algorithm for fairly allocating available bandwidth between contending connections at a contention point in a data network. The allocation is based on global queue size at the contention point and a weighted value assigned to the data traffic. The device and algorithm find particular application in an ATM network which supports the available bit rate (ABR) service category.

11 Claims, 1 Drawing Sheet

FAIR SHARE BANDWIDTH ALLOCATION ALGORITHM AND DEVICE

FIELD OF THE INVENTION

This invention relates to the management of data traffic in a network having multi-data streams and more particularly to an algorithm and device for fairly allocating available bandwidth to contending connections in a data network, the allocation being based on global queue size.

BACKGROUND

The device and algorithm of the present invention will be described and illustrated with reference to the available bit rate (ABR) service category of an asynchronous transfer mode (ATM) network. It is to be understood, however, that this is only one environment in which this invention finds application.

As is known the ATM Forum Traffic Management working group has defined five service categories which are distinguished by the parameter sets which describe source behaviour and quality of service guarantees. These five service categories are; constant bit rate (CBR), real-time variable bit rate (rtVBR), non-real-time variable bit rate (nrtVBR), available bit rate (ABR) and unspecified bit rate (UBR). The ABR and UBR service categories are intended to carry data traffic which has no specific cell loss or delay guarantees. The UBR service category is the simplest of the two and may in future provide only a guaranteed minimum cell rate. The ABR service category provides source-to-destination flow control, with minimum cell rate (MCR) guarantee, that attempts but is not guaranteed to achieve zero cell loss. The ABR service category was defined in order to take advantage of available bandwidth within an ATM network during intervals when higher priority traffic was not completely utilizing the network capacity. In order to meet nominal cell loss guarantees ABR traffic employs a feedback loop which effectively monitors congestion at nodes throughout the network and periodically reports back to the source so that data traffic can be adjusted accordingly.

ABR flow control is achieved by the source sending special resource management (RM) cells through the network. Each switch in the network indicates its congestion status by optionally writing into the RM cell and forwarding the cell into the next switch in the data path. Finally, the destination turns the RM cell back towards the source and the switches in the backward data path mark congestion information into the RM cell which is ultimately received by the source. The source then adjusts its sending rate in response to the information contained in the RM cell.

The RM cell contains three fields which may be written to in order to describe the congestion status of the switch: a no increase (NI) bit which indicates that the source must not increase its sending rate; a congestion indication (CI) bit which indicates that the source must decrease its sending rate; and an explicit rate (ER) field which contains the minimum explicit rate calculated by any switch in the data path.

An explicit rate (ER) algorithm must be deployed at any contention point in the data path. For the purpose of this description a contention point is defined as a queuing point in which the aggregate arrival rate of cells is greater than the aggregate service rate. In the context of the present invention the service rate pertains to the capacity available to ABR and is in general time-dependent. A switch may have one or more contention points. An ER algorithm attempts to fairly distribute bandwidth between ABR connections at a contention point.

SUMMARY OF THE INVENTION

It is an object of the present invention to provide a device and algorithm which performs an explicit rate calculation to achieve fair allocation of bandwidth and which requires only an aggregate count of ABR cells.

Therefore, in accordance with a first aspect of the present invention there is provided a device for fairly allocating available bandwidth between contending connections at a contention point in a switch for processing multi-service traffic streams between a source and a destination comprising; queue monitoring means to continually compare the aggregate queue depth of the aggregate traffic stream at the contention point with a predefined queue depth threshold and periodically generating a function therefrom; an algorithm device for calculating the currently offered bandwidth at the contention point based on the function and the offered bandwidth of a previous calculation; calculating means to periodically generate an offered cell rate value for the contention point based on the currently offered bandwidth and a service weight assigned to the traffic stream; and feedback means to return the offered cell rate value to the source for updating the flow rate of the traffic stream therefrom.

In a preferred embodiment of the invention the device and algorithm are used in relation to the available bit rate service category in an asynchronous transfer mode communication network.

In accordance with a second aspect of the present invention there is provided a method of fairly allocating bandwidth between contending connections at a contention point in a switch for processing multi-service cell traffic streams from multiple sources, the method comprising the steps of monitoring the aggregate cell queue depth at the contention point, comparing the aggregate queue depth associated with the aggregate traffic stream at the contention point with a predefined queue depth threshold and periodically generating a function therefrom; calculating the currently offered bandwidth at the contention point based on the aforementioned function and the offered bandwidth of a previous calculation; periodically generating an offered cell rate value for the contention point based on the currently offered bandwidth and a service weight assigned to the traffic stream; and returning the offered cell rate value to the source for updating the flow rate of the traffic stream therefrom.

In accordance with a third aspect of the present invention there is provided a recursive algorithm for fairly allocating bandwidth between ABR connections at a contention point in an ATM network. The algorithm has the form:

$$OBW(k)=g(QD,T)\times OBW(k-1)$$

where:
 OBW is the total offered bandwidth to all ABR connections;
 QD is the total queue depth utilized by all ABR connections; and
 T is a configurable threshold.

BRIEF DESCRIPTION OF THE DRAWINGS

The invention will now be described in greater detail with reference to the attached drawings wherein.

DETAILED DESCRIPTION OF THE INVENTION

Figure 1:
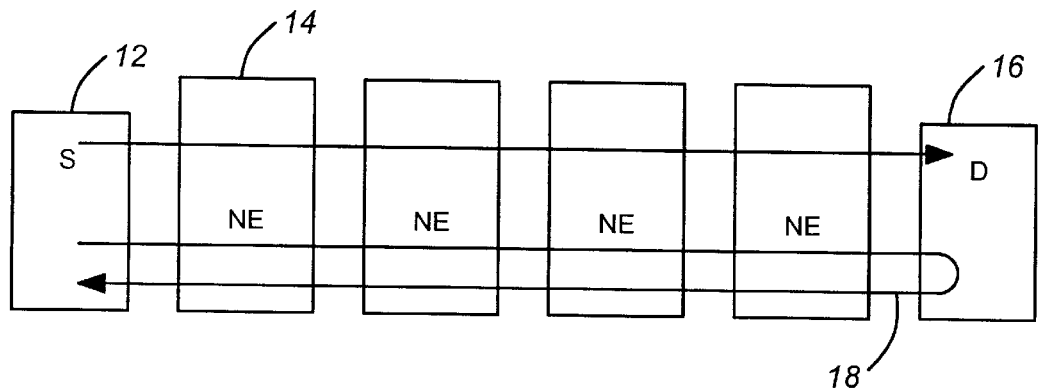
FIG. 1 is a block diagram of an ATM network for the ABR service category.

FIG. 1 is a simplistic representation of an ATM network for delivering ABR service category traffic. ATM fixed length cells are transmitted from source 12 through network elements 14 to a destination 16. Network elements 14 include switches which respond to header information in the ATM cell in order to direct the cell to the designated destination. Each network element may have one or more congestion points or nodes at which the data traffic contends for service. Higher priority cells such as CBR and rtVBR service categories receive priority while ABR and UBR cells may be placed in queues pending further processing. When the queue depth at contention points in a data path exceed a predefined limit further cells assigned to that path are discarded. As discussed previously ABR cells include resource management cells which include a bit field for recording congestion information throughout the data path. The resource management cells, on reaching the destination, are returned through the network elements to the source where the congestion information is processed so as to control the egress of ABR traffic from the source. The feedback loop is shown by line 18 in FIG. 1.

The present invention relates to the explicit rate field of the resource management cells as it is this field which contains information respecting available bandwidth and queue lengths through the network.

Each ABR connection is assigned a weight which may be assigned to be equal to the minimum cell rate (MCR) guaranteed to the connection or may be assigned arbitrarily through the switch configuration.

A typical requirement of ABR bandwidth distribution between connections at the network level is that max-min fairness be achieved. Max-min fairness is defined as follows:

Consider a network of multiple switching elements. The network is populated by a number of connections. The goal is to allocate bandwidth at each link so that the link is fully utilized while simultaneously achieving a fair distribution of bandwidth between connections.

Max-min fairness can be intuitively understood as the distribution of bandwidth between connections, such that each connection receives an end-to-end bandwidth allocation which is equal to its fair share at the point in its path through the network where resources are most scarce. The max-min fair distribution to connections is given by the following iterative definition.

For each link, reduce the available link bandwidth, $LR_j$, by an amount equal to the total guaranteed bandwidth of all connections which utilize the link. Assign a weight, $W_{ij}$, to each connection, i, and for each link, j, that the connection traverses. The weight is assigned according to the bandwidth distribution method: equal share; MCR proportional; or weight proportional. If a connection does not utilize a particular link, then $W_{ij}$ is equal to zero. Perform the following steps:

1. Let S represent the set of all connections in the network which have not been allocated bandwidth. Calculate the available bandwidth, $B_{ij}$, for each connection at each link, by the formula, $$B_{ij} = LR_j \times \frac{W_{ij}}{\sum_{i \in S} W_{ij}}$$

2. Determine (n,m) by the following formula, $$(n,m) = \{(i,j) | \min(B_{ij}, A_{i,j})\}.$$

3. Let $A_i$ represent the bandwidth allocated to connection i, and set, $$A_n = B_{nm}.$$

4. Reduce the available bandwidth, $LR_j$, on all links which are utilized by connection, n, by the value, $A_n$. Remove n from the set, S (i.e. it has now been allocated bandwidth). Proceed to step 1 unless the set, S, is empty.

The number of iterations is equal to the number of connections in the network. When the iterations are complete, the set of values, $A_i$, represent the max-min bandwidth allocation in the network.

ER algorithms which attempt to achieve a max-min distribution of bandwidth at the network level are known. One such algorithm described by Cathy Fulton et al, "UT: ABR Feedback Control with Tracking", ATM Forum 96-1540 Traffic Management, achieves the max-min fairness by attempting to track the total bandwidth available to ABR at a contention point with the aggregate arrival rate. Such an algorithm requires that the switch implement aggregate input and output rate monitoring at each contention point. Another algorithm disclosed by Lampross Kalampoukas, "Dynamics of an Explicit Rate Allocation Algorithm for Available Bit-Rate (ABR) Service in ATM Networks", UCSC-CRL-95-54, Feb. 1, 1996, measures the bandwidth available to ABR and utilizes per connection input rate monitoring to achieve max-min fairness. Another algorithm disclosed by Kim, Jangkyung, et al, "Fixed Queue Length Control for ABR with Long Propagation", ATM Forum Document Number 97-0008, utilizes aggregate ABR congestion information to calculate explicit rates but fails to achieve max-min fairness. In this algorithm the bandwidth shared by all ABR connections has a strict upper bound and thus the bandwidth cannot be expected to converge to a value which provides full link utilization under general network conditions.

All known ER algorithms which achieve max-min fairness require that the bandwidth available to ABR be determined at a contention point by measuring the bandwidth utilized by all higher priority service categories and subtracting the value from the total capacity at the contention point. Such a measurement requires resources and can be prohibitively expensive when there are a large number of contention points in the switch. The present invention provides a device and algorithm which performs an ER calculation achieving max-min fairness and requires only an aggregate count of ABR cells. This is accomplished by satisfying the following two requirements at a contention point:

1. The bandwidth available to ABR is fully utilized unless every connection is constrained by another contention point in the data path. The bandwidth available to ABR changes dynamically and is given by the difference between the capacity of the contention point and the bandwidth utilized by higher priority traffic.

2. The bandwidth utilized by ABR is apportioned between ABR connections in proportion to the assigned weight of each connection.

The invention achieves the first requirement by recursively adjusting the total of all explicit rates fed back to the ABR sources until the aggregate ABR queue depth equals a target queue depth. The aggregate queue depth represents the integral of the difference between the aggregate ABR service rate and the arrival rate. An algorithm which causes the aggregate ABR queue depth to converge to a specific threshold will thus ensure that the bandwidth available to ABR is fully utilized over the long term.

The invention achieves the stated second requirement by dividing the total offered bandwidth between connections according to the weight assigned to each connection.

Figure 2:
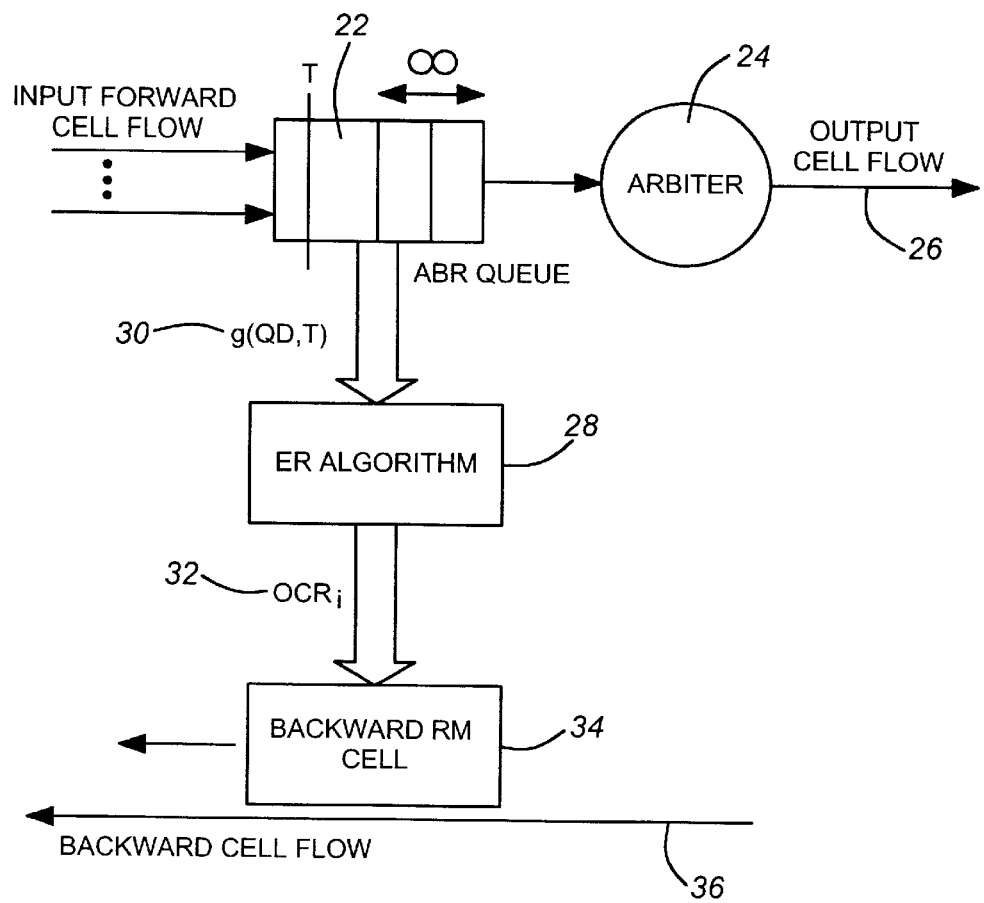
FIG. 2 illustrates the device and algorithm for fairly allocating available bandwidth according to the present invention.

FIG. 2 is an illustration of the architecture of the present invention. Both ABR data and RM cell traffic from the source arrives at a contention point which in FIG. 2 is shown as an ABR queue 22. In FIG. 2 ABR queue 22 represents the aggregate count of all ABR cells queued. This construction does not preclude queuing and servicing each connection independently. In FIG. 2 the shaded portion of ABR queue 22 represents the total queue depth utilized by all ABR connections. This is identified as QD in the drawing. The line T is a configurable threshold which represents a preselected target for the queue depth. ABR traffic as well as higher priority traffic contends for the capacity at queuing point 22. The arbiter 24 decides at each cell slot whether to transmit an ABR cell or a higher priority cell. The output cell flow 26 is comprised of both high priority and ABR traffic. Periodically the ABR queue 22 generates the function g(QD, T) and passes the result to the ER algorithm 28. The ER algorithm calculates the offered bandwidth according to the formula $$OBW(k)=g(QD,T)\times OBW(k-1)$$

where g(QD,T) is given by either $$g(QD,T) = \begin{cases} 1-x & \text{if } QD > T \\ 1+x & \text{if } QD \leq T \end{cases}$$

The parameter T is a configurable threshold, and x is a small real number in the range [0,1]. The function g(QD,T) is only dependent on global queue congestion and threshold. Alternatively, a function, g(QD,T1,T2) could be defined which takes the form $$g(QD,T1,T2) = \begin{cases} 1-x & \text{if } QD > T1 \\ 1 & \text{if } T1 \geq QD > T2 \\ 1+x & \text{if } QD \leq T2 \end{cases}$$

This second form employs a dead band in which the offered bandwidth is neither increased or decreased. In general terms the number of bands in the queue depth may be increased such that the update to OBW(k) may assume an arbitrary function in the variable, QD.

Note that the ABR queue, 22, which generates the function, g(QD,T), 30, need not be located on the same card as the ER algorithm, 28. The result of g(QD,T), 30, could be sent in a special RM cell that is extracted from the cell stream by the ER algorithm, 28. This is an important application of the invention because the generation of g(QD, T) can be achieved very inexpensively. Thus the ER calculation can be distributed between a card with scarce resources and a card with less strict resource constraints. Alternatively the update of OBW(k) may be given by, $$OBW(k)=OBW(k-1)+g(QD,T)$$

where the function g(QD,T) takes the form $$g(QD,T)=G\times(T-QD)$$

where G is a configurable parameter and provides a gain on the feedback. This form provides a linear proportional control of the queue size.

An event triggers the calculation of the offered cell rate, OCRi, 32, for a particular connection by the ER algorithm 28. This event may be internally scheduled, or generated by the arrival of a forward RM cell for the connection. The offered cell rate, $OCR_i$ for connection, i, is given by, $$OCR_i=\min[PCR_i, (MCR_i+(W_i\times OBW(k)))].$$

The backward RM cell, 34, contains a field which holds the explicit rate for a connection. If the OCRi, 32, is less than the value in the ER field of the backward RM cell, 34, then the value of OCRi, 32, is written into the ER field of the backward RM cell, 34. That is $$BERi=\min(BERi, OCRi)$$

The RM cell is transmitted to the ABR source (not shown) via the backward cell flow, 36. At the ABR source the outflow rate of ABR cells is controlled in accordance with the ER information contained in the backward cell.

While a particular embodiment of the invention has been described and illustrated it will be apparent to one skilled in the art that various alternatives to this embodiment can be implemented. It is to be understood that such alterations will come within the scope of the present invention as defined in the attached claims.

What is claimed is:

1. A method of fairly allocating bandwidth to contending connections at a queuing point in a data network comprising:
   computing a common control factor (OBW) used as the basis for allocating bandwidth to all contending connections wherein the computing of the common control factor is by a non linear process including, the steps of multiplying a previous value of the control factor by a function of queue depth and determining a value for the function of queue depth in order to achieve a target queue depth; and
   computing the bandwidth to be attributed to each contending connection by multiplying the common control factor by a weighting factor corresponding to that connection.

2. The method as defined in claim 1 wherein said data network is a packet-based switching network.

3. The method as defined in claim 2 wherein said packet based network is an Asynchronous Transfer Mode (ATM) network.

4. The method as defined in claim 3 wherein said contending connections include Available Bit Rate (ABR) category of service data traffic.

5. The method as defined in claim 4 wherein said ABR traffic includes resource management (RM) cells carrying Explicit Rate (ER) information through said network.

6. The method as defined in claim 5 wherein said ER information includes said bandwidth to be attributed to individual connections.

7. A system for fairly allocating bandwidth to contending connections at a queuing point in a data network comprising:
   computing means to compute a common control factor (OBW) used as the basis for the allocating bandwidth to all contending connections wherein the computing of the common control factor is by a non-linear process including the steps of multiplying a previous value of the control factor by a function of a queue depth and determining a value for the function of queue depth in order to achieve a target queue depth; and means to compute the bandwidth to be attributed to each contending connection by multiplying the common control factor by weighting factor which correspond to that connection.

8. A system as defined in claim 7 wherein said data network comprises an ATM system carrying multi-service traffic including ABR category of traffic.

9. A system as defined in claim 8 wherein said ABR traffic includes a resource management cell carrying congestion information such as Explicit Rate (ER) information through said network.

10. A system as defined in claim 9 wherein said ER information includes bandwidth values that may be attributed to individual connections.

11. A system as defined in claim 10 wherein said ER information in said RM cell is changed to include a new bandwidth value attributed to individual connections if said bandwidth value is lower than said ER information already in said RM cell.

* * * * *